Figure 2:
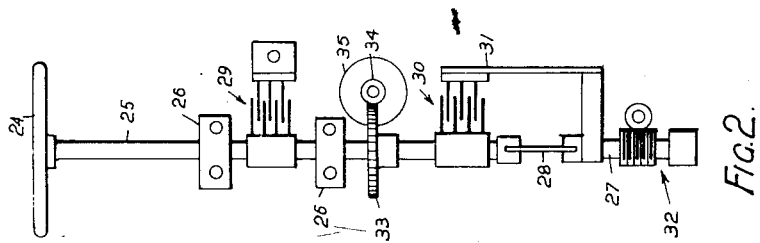

May 30, 1950  T. S. SKILLMAN  2,509,617

VARIABLE FREQUENCY REMOTE CONTROL SYSTEM

Filed Dec. 14, 1943  5 Sheets-Sheet 1

Inventor:
Thomas Samuel Skillman
by his Attorneys
Howson & Howson

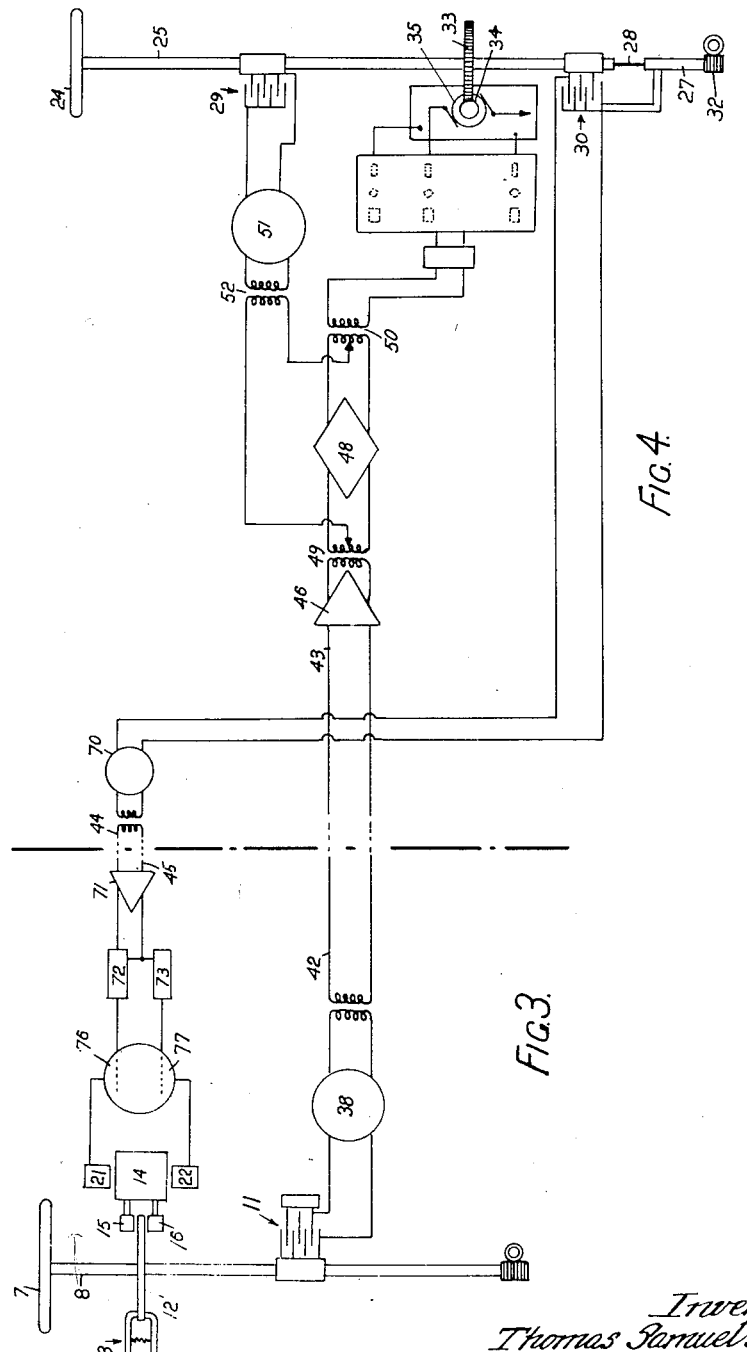

May 30, 1950        T. S. SKILLMAN        2,509,617
VARIABLE FREQUENCY REMOTE CONTROL SYSTEM
Filed Dec. 14, 1943        5 Sheets-Sheet 4
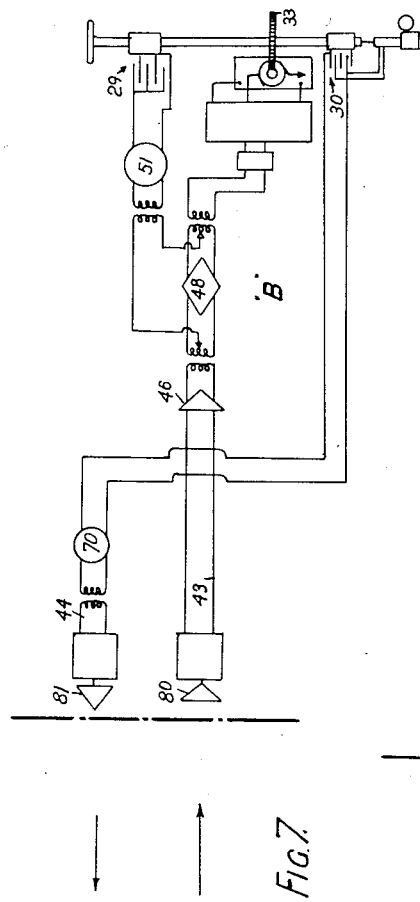
FIG. 7.
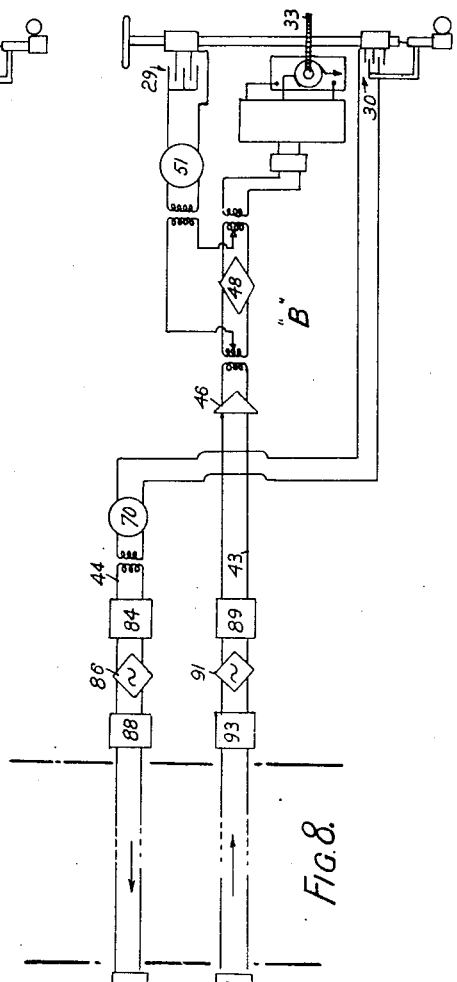
FIG. 8.
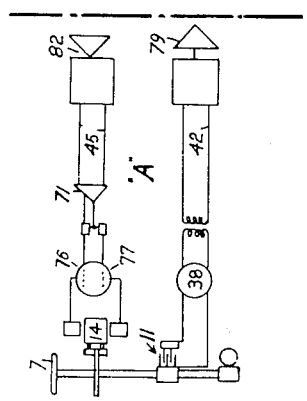
Inventor:
Thomas Samuel Skillman
by his Attorneys
Howson & Howson

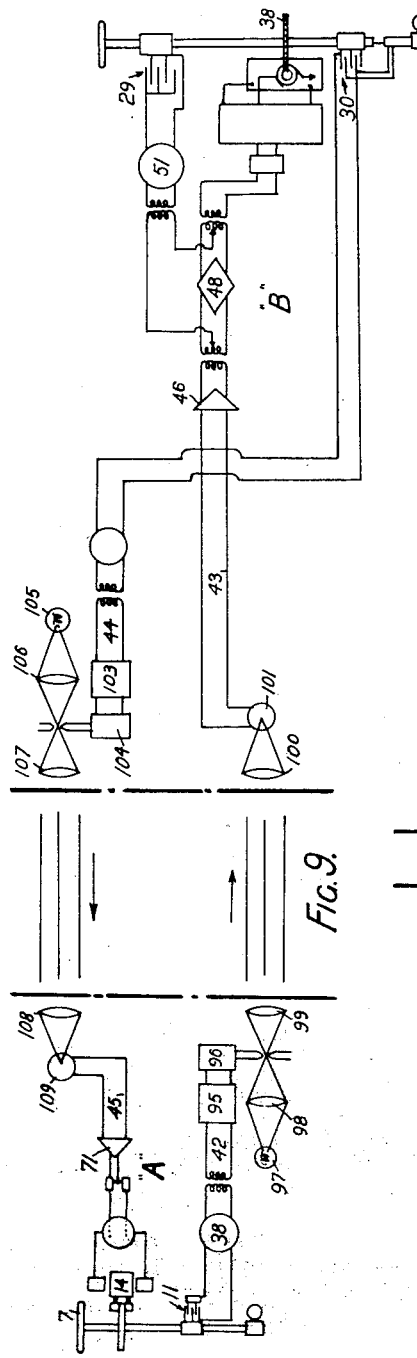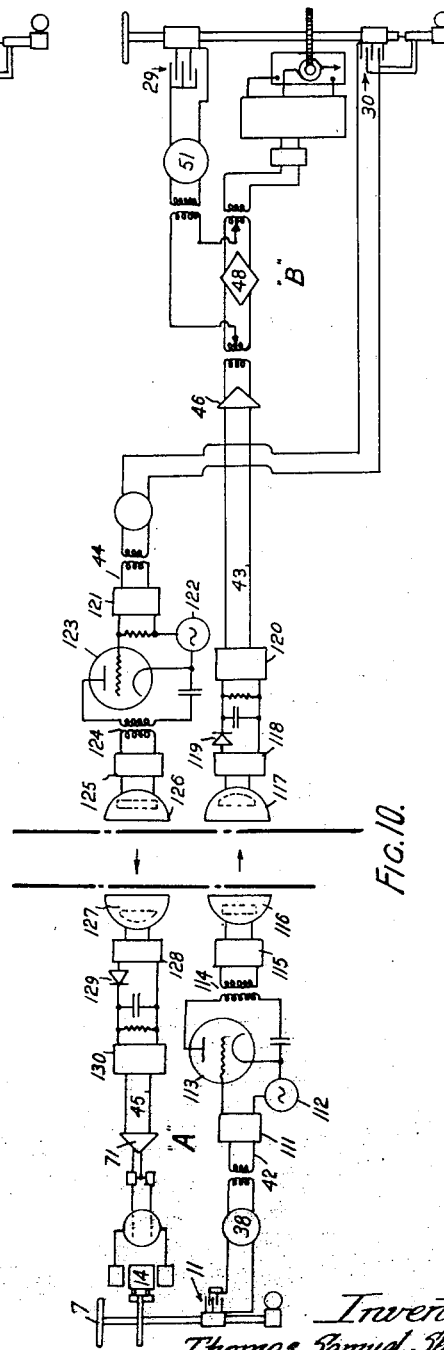

Patented May 30, 1950

2,509,617

UNITED STATES PATENT OFFICE 2,509,617

VARIABLE FREQUENCY REMOTE-CONTROL SYSTEM

Thomas Samuel Skillman, Mosman, near Sydney, New South Wales, Australia, assignor to Punch Engineering Pty. Limited, Cammeray, near Sydney, New South Wales, Australia, a company of New South Wales Application December 14, 1943, Serial No. 514,263
In Australia December 10, 1942

9 Claims. (Cl. 318—28)

This invention relates to a system of remote control for various purposes; for example it may be applied to power operated vehicles, aeroplanes, torpedoes, gliding or power actuated projectiles.

One object to the invention is to provide an improved means for positioning a controlled mechanism in accordance with the position of a controlling mechanism, in such a manner that a very close setting of the controlled mechanism is possible.

Hitherto it has been customary to provide the control mechanism with a number of detectors or with an impulse counting device or with a number of fixed positions controlled in some manner or other, and in order to obtain a continuous range of response or movement of the controlled mechanism complex devices have been found necessary.

Other devices have been proposed in which changes in the position of a controlling mechanism are transferred to the controlled mechanism in the form of changes of a transmitted frequency. The controlled mechanism includes tuned circuits to select these frequency changes and to operate the mechanism accordingly, at the same time altering the point of resonance of the tuned circuits.

These arrangements, however, have the disadvantage that they work only satisfactorily when small changes are made in the position of the controlling mechanism or when such changes are made rather slowly, as otherwise the transmitted frequency changes so quickly that it gets out of the pass range of the tuned circuits before the controlled mechanism is able to follow and alter the tuning of the associated circuits. Furthermore such arrangements are liable to false operation through interference signals.

All these known arrangements operate only in one direction from the controlling to the controlled mechanism, but do not provide any facilities for the transmission of signals in the backward direction from the controlled mechanism to the controlling mechanism.

An object of the invention is the provision of means whereby rapid response by the operator of the controlling mechanism can be achieved in those cases where the controlled mechanism through the mechanism actuated thereby is subject to deflecting forces. For example, in steering a remote controlled vehicle or a remote controlled aeroplane, the vehicle or aeroplane and consequently the controlled mechanisms are subject to deflecting forces due to the irregularities of the road or of the atmosphere through which the vehicle or aeroplane is travelling. When a motor car or aeroplane is driven by a person sitting in it, these deflecting forces on the controls play a very important role in such as they stimulate direct muscular response from the nervous sub-centres. These responses are, of course, absent when the vehicle is remotely controlled and hitherto in such cases the deflecting forces must be compensated by a reaction from the operator which is stimulated only by visual means.

A feature of the invention is the provision of means whereby signals indicating the deflecting forces operating on the controlled mechanism through the example vehicle or aeroplane are transmitted back to the controlling mechanism.

A further object of the invention is the provision of means whereby the controlling mechanism is arranged to reproduce the "feel" of the controls of the vehicle or aeroplane or other device to which the invention is applied in such a manner that the operator of the controlling mechanism exhibits the same reactions as he would if he were directly operating the controls of the vehicle or aeroplane or other device. It has been found that this quality of "feel" is intimately associated with the manner in which the reacting forces (arising from wind currents or road irregularities in the case instanced) vary with the position of the controls. For example, a joy-stick kicks back in response to a wind impulse. The reaction required from the operator is quite different in the case of a slow steady push over a considerable movement as compared with that of a constant short jerk of high force but little travel. If the operator of the controlling mechanism in this case is to steer the remote controlled vehicle or aeroplane as accurately as possible, this difference in the reacting forces must be reproduced at the controlling device in order that the instinctive reactions can be called up.

A still further feature of the present invention is a provision of means whereby the deflecting forces operating on a controlled mechanism through the example vehicle or aeroplane are used to vary the frequency of a signal transmitted back to the controlling mechanism and is used there to reproduce the same deflecting forces upon the controls of the controlling mechanism.

The aforesaid and other features of the invention will be described with reference to the annexed drawings which depict one embodiment thereof.

Figure 1:
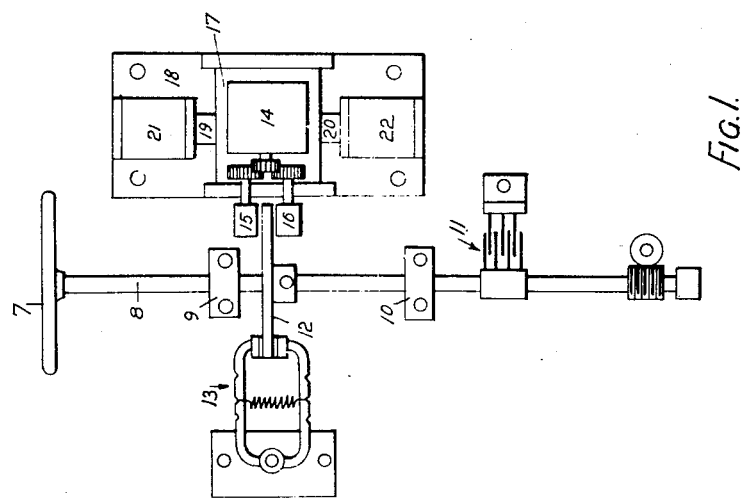
Figures 5, 6:
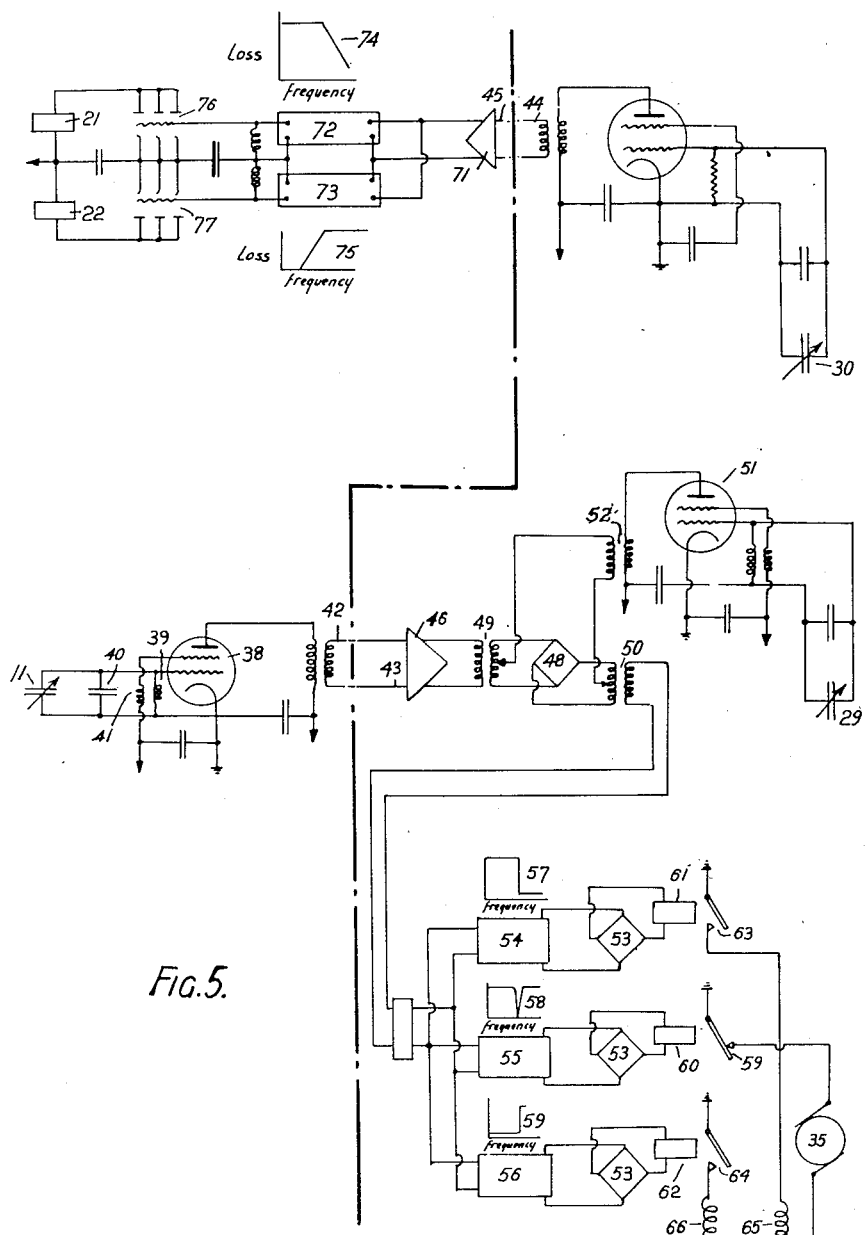

Fig. 1 shows the steering wheel of a controlling device together with its associated mechanism; Fig. 2 is a similar view of the remote steering mechanism; Fig. 3 shows the electrical circuit and controlling mechanism of Fig. 1; Fig. 4 shows the electrical circuit and controlling mechanism of Fig. 2; Figs. 5 and 6 show the electrical circuits of Figs. 3 and 4 in detail.

Figs. 7, 8, 9 and 10 illustrate diagrammatically how the controlling mechanism can operate the remote control mechanism by means of transmission paths, such as by wireless, carrier circuit, light beam and sound waves respectively.

Considering first Fig. 1. The steering wheel 7 of shaft 8 carried in bearings 9 and 10 moves the variable condenser 11 in accordance with the movement of the operator. A fly wheel 12 and a tensional friction mechanism 13 provides the inertia and the damping required to simulate the "feel" of the normal steering wheel 7. An electric motor 14 causes friction driving wheels 15 and 16 to rotate continuously in bearings mounted on the base 17 which supports the motor 14. This base 17 is slidably mounted on the bed plate 18 secured to any suitable supports. Said base 17 has a pair of armatures 19 and 20 which are operated by solenoids 21 and 22 respectively in order to move one of the two friction drives 15 and 16 into contact with the wheel 12; said solenoids are rigidly secured to the bed plate 18. The wheel 12 is fixed upon the shaft 8 and is turned along with the steering wheel 7.

Fig. 2 illustrates the remotely disposed steering wheel 24 with its shaft 25 mounted in bearings 26 said shaft 25 has an extension shaft 27 secured thereto by a leaf 28. Mounted on the shaft 25 are a pair of condensers 29 and 30. One set of plates of the condenser 30 are mounted upon a bracket 31, the latter is affixed to the extension shaft 27 which shaft extension also has the gearing 32 for the steering mechanism (not shown). The shaft 25 is furnished with a toothed wheel 33 gearing with the gear pinion 34 on the shaft of electric motor 35.

When the operator turns the wheel 7 in order to change the position of the steering mechanism at the remotely disposed location as shown in Fig. 2 the change in position is signalled to the electrical gear of Fig. 2 by means of the condenser 11 of Fig. 1.

When a signal is received back in response to a deflecting force at the controlled end, this causes solenoids 21 or 22 to be energised and thus brings the friction drive wheels 15 or 16 into contact with the wheel 12 and causes a force to be impressed upon the steering wheel 7 said force being proportionately to the pull exerted by either of the solenoids.

Owing to the presence of the operator's hand on the steering wheel 7 and also the presence of the friction brake means 13 the wheels 15 and 16 will always slip on the wheel 12 and under these conditions a fairly accurate relationship between the pressure on the wheels 15 and 16, that is to say the pull from either of the solenoids 21 and 22 and the force exerted on the control wheel 7 can be obtained.

It will be noted that the pull produced by the wheels 15 or 16 is independent of the position of the control gear 7. Thus, e. g. if there is a constant drag on the steering gear at the controlled end, this will be transmitted to the controlling device and the same constant drag will be felt upon the wheel 7. Similarly a sudden jerk at the controlled end can be impressed by suitable operation of the friction drive. The manner in which the signal is fed into solenoids 21 and 22 to produce these different "answer back" effects will be described later in connection with Figs. 5 and 6.

Turning now to Fig. 5 the valve 38 is an oscillator valve with a tuned circuit 39, 40 and a back-coupling coil 41. The frequency of oscillation is determined by the tuned circuit together with the setting of the variable condenser 11. In this way a current is sent out over the line 42, the frequency of which is determined by the setting of condenser 11.

This current may be transmitted to the controlled mechanism in any one of many different ways dependent upon the type of transmission path available. It may be a physical line, a carrier circuit, a radio circuit, a radio circuit with multiple modulation, a modulated light beam, a sound wave system or any other means whereby the frequency leaving the line 42 may be reproduced at the receiving end in line 43. In the same way the signals coming back from the line 44 of Fig. 6 can pass over any channel—in many cases the same channel as the forward signals, provided that the current arriving at line 45 is substantially unchanged in frequency.

At the receiving end, as shown in Fig. 6 the signals coming in from line 43 are amplified in amplifier 46 and then pass through a modulator consisting of dry rectifier 48 and two transformers 49, 50 arranged in the well known ring modulator circuit. The carrier for this modulator is supplied from the valve 51 via the transformer 52 and the frequency of the carrier is determined by the variable condenser 29 associated with this circuit and its setting is determined by the position of the driving shaft 25.

A current having a frequency equal to the difference between the frequency of the current coming from the line 43 and the frequency of the current coming from the carrier oscillator 51 appears at the output of the modulator 48 and is fed into the three filters 54, 55 and 56. Each filter is associated with a rectifier and a relay. Above each filter is shown a diagram 57, 58 and 59 giving its attenuation frequency characteristic, attenuation being the ordinate and the frequency being the abscissae. It will be seen that at a certain value of difference frequency represented by the pass range of filter 55, relay 60 will be operated while at any other difference frequency relay 60 will be unoperated and either relay 61 or relay 62 will be operated depending upon whether the difference frequency is greater or less than the operating frequency of relay 60.

This combination of filters 54, 55 and 56, rectifiers 53 and relays 60, 61 and 62 gives in effect a hunting circuit which can indicate to a searching mechanism, in which direction to move and which can provide a test to stop the searching circuit as soon as the difference frequency reaches the required value to operate relay 60. This has been achieved in practice by connecting the relay contacts 63 and 64 to two opposing fields 65 and 66 in the driving motor 35.

When the circuit of field 66 is closed by the operation of relay 62 combined with the release of relay 60 this is clearly in response to the fact that the difference frequency is less than the value required. Relay 67 is energised and contact 68 is closed whereby the motor 35 is brought into circuit. The motor 35 thereupon operates and moves the driving shaft 25 of the remotely disposed steering wheel 24 thereby varying the condenser 29 in Fig. 6 and increasing the difference frequency. When the relay 60 operates at the correct value of difference frequency contact 59 is opened and the motor circuit is broken, shaft 25 comes to rest in a new position, which is clearly determined by the value of frequency coming in from line 43. Each change in the incoming frequency operates the relay group again, and causes the circuit to hunt once more until it comes to the new position determined by the new frequency.

It will be clear that the accuracy with which the shaft 25 may be set is determined only by the sharpness of the filters 54, 55 and 56 and by the accuracy of the mechanical parts. In a practical case the filter 55 operated at 1,000 c./sec.+5 c./sec. and the incoming frequency varied over the range 5,000 to 100,000 c./sec. The shaft 25 therefore could be positioned to an accuracy of 5 parts in 95,000. This particular frequency choice does not permit of sudden changes from one end of the range to the other, since the operation becomes confused if the difference between the incoming frequency and the local oscillator 51 exceeds 2 kc./sec. In another practical case where rapid changes were required the relay 60 operated on 3,000 c./sec.+20 c./sec. and the received current varied from 1 kc./sec. to 4 kc./sec. The latter example is useful for steering a remote controlled projectile, the former example is more suited to positioning guns by remote control.

Should relays 61 and 62 be both operated together, for example due to interference, relay 67 remains unenergised as said relay 67 is provided with a pair of opposed windings consequently contact 68 remains open and the motor 35 remains out of action, and again no movement takes place in the controlled mechanism. Interference or failure of the transmission path therefore holds the controlled mechanism on its course, and only prevents its course being changed.

Shaft 27 is however coupled with 25 by means of a leaf coupling 28, see Figs. 2 and 4, so arranged that deflecting forces applied to shaft 27 will cause a certain amount of torsion to take place between shafts 27 and 25. This torsion will cause a change to take place in the variable condenser 30 and the change in capacity of condenser 30 will give a measure of the amount of torsion and therefore of the magnitude of the deflecting force applied to shaft 27. By connecting condenser 30 in an oscillator circuit, as shown in Fig. 6 it is thus possible to cause the deflecting forces to produce a change in the frequency of an oscillator 70 which transmits current back to the controlling end. In Fig. 6 condenser 30 does this in exactly the same manner as already described for the other oscillators.

The frequency received back indicative of the deflecting forces is applied via amplifier 71 to two filters 72 and 73. Adjacent to each filter on the diagram 74 and 75 is shown its loss characteristic. It will be seen that it is a combination of filter and equaliser. When there is no deflecting force the frequency is such that neither filter passes any current, and under these conditions the detectors 76 and 77 pass no current. Any decrease in the frequency however, representing deflecting forces in one direction, causes the current to pass through filter 73 and thus energises solenoid 22. The current applied to said solenoid 22 will depend upon the degree to which the frequency received diverges from the nominal frequency, that is to say, is determined by the deflection of condenser 30, that is to say is determined in turn by the magnitude of the deflecting forces.

Similarly if the frequency increases solenoid 21 is energized with the current proportional to the frequency change. The manner in which the solenoids 21 and 22 operate to reproduce the deflecting forces upon the wheel 7 has already been described.

It will be clear that the foregoing description of one particular embodiment of the invention does not limit the scope of the invention and that the principle can be applied in many other ways without departing from the spirit of the invention. For example, the answer back signals may be transmitted by means of a mechanism and relay group similar to that used for the forward signals, and vice versa. Similarly, the methods employed for setting the shaft 25 need not be limited to the use of a motor and worm as shown, but could be effected by any other mechanism such as, for example, hydraulic power which would be cut off when the relay 60 is operated. Similarly the deflecting forces could be reproduced at the controlling end in may other ways, for example, by solenoids acting directly upon the controlling device instead of through friction drives, or by means of hydraulic rams released by the operation of filters 72 and 73. Similarly also, the manner in which the deflecting forces at the controlling end are recorded and converted into a frequency change, permits of many different executions of which that given is only an example.

Referring to Fig. 7 in which A and B represent the controlling mechanism and remote controlled mechanism respectively and similar parts bearing similar references as depicted in Figs. 3 and 4. The controlling mechanism A is provided with a transmitter 79 coupled to the line wires 42. Oppositely disposed to the transmitter 79 is a wireless receiver 80 coupled to the line wires 43 of the remote control mechanism B.

Current passing from the controlling mechanism A over the transmission lines 42 would be used to modulate transmitter 79 and would be received by the receiver 80 passing into the transmission lines 43 to the controlled mechanism B.

To transmit signals back from the remote controlled mechanism, the line wires 44 are coupled to the transmitter 81, the latter being modulated by the signals. Signals are received by a receiver 82, and after de-modulation pass into the line wires 45 associated with the receiver 82. Controlling operation is as before described.

In Fig. 8 wherein the signals are superimposed upon a carrier circuit which may be an open wire carrier channel as well known in practice. The current passing through the transmitting line wires 42 and 44 of the controlling mechanism A and remote control mechanism B respectively pass through low pass filters 83 and 84, through modulators 85 and 86, thence through band pass filters 87 and 88, associated respectively with the line wires 42 and 44. At the receiving ends of the carrier channel the signals pass through another set of band pass filters 89 and 90 through demodulators 91 and 92 thence through low pass filters 93 and 94 receiving lines 43 and 45 respectively. Controlling operation as before described.

Referring to Fig. 9 wherein a light beam is utilized. The current in transmission line wires 42 operates an amplifier 95 and a light valve 96. Associated with the amplifier 95 and light valve 96 is a light source 97 focused by a system of lenses 98 and 99. The beam of light projected by the lens 99 is received by a lens 100 associated with a photo-electric cell 101, the latter is coupled to an amplifier 46, whereby the output of the photo-electric cell is amplified. Such amplifier 46 is in circuit with the receiving line wires 43.

Signals from the remote controlled mechanism pass out by line wires 44 operate amplifier 103, a light valve 104. Associated with the amplifier 103 and light valve 104 is a source of light 105 focussed by a system of lenses 106 and 107. The beam of light from the lens 107 is projected onto a receiving lens 108 associated with a photo-electric cell 109 the latter is coupled to an amplifier 71, said amplifier 71 is in circuit with the receiving line wires 45. Operation of controlling is as before described.

Fig. 10 shows a transmitting medium using high frequency sound waves. Transmitting line wires 42 are connected to an amplifier 111 which in turn modulates source 112 of suitable frequency current. The valve 113 via the output transformer 114 supplies modulated current to the filter 115, said filter selects the carrier and side band required, thence conveyed to the loud speaker 116. Oppositely disposed to this loud speaker 116 is a microphone 117 which receives the acoustic energy and passes such energy into an amplifier 118 and demodulator 119 thrugh the filter 120 thence into receiving line wires 43. The transmitting line wires 44 of the remote controlled mechanism are connected to an amplifier 121, a modulating source 122. The valve 123 via output transformer 124 supplies modulated current to the filter 125, selected carrier and side band is conveyed to the loud speaker 126. Microphone 127 on the controlling mechanism passes received energy into an amplifier 128, demodulator 129 through filter 130 thence to the receiving line wires 45; by this means signals are received back into the controlling mechanism A. Operation of the controlling mechanism and remote control mechanism is operated as before described.

I claim:

1. A remote control system comprising a transmitting station including a movable controlling mechanism, a source of signal current the frequency of which is determined by the position of the controlling mechanism, a receiving station including a movable controlled mechanism, means for moving the controlled mechanism, frequency responsive means for directionally energizing the means for moving the controlled mechanism, means for transmitting the signal current from the transmitting station to the receiving station, a second source of signal current, means at the receiving station for varying the frequency of said second signal current in accordance with the magnitude of a deflecting force applied to said movable controlled mechanism, means for transmitting said second signal current to the transmitting station, means at the transmitting station for applying a frictional load to said movable controlling mechanism, and frequency responsive means at the transmitting station for energizing said frictional load applying means in response to variations in frequency of the second signal current.

2. The remote control system according to claim 1, wherein said frequency responsive means at the transmitting station for energizing the frictional load applying means includes means for varying the magnitude of the applied frictional load in accordance with variations in the magnitude of the deflecting forces concurrently operating upon the movable controlled mechanism at the receiving station.

3. A remote control system, comprising a controlling mechanism including means for transmitting a signal current whose frequency is determined by the setting of said controlling mechanism, a controlled mechanism receiving said signal current and actuated thereby, said controlled mechanism including an amplifier, an oscillator and a modulator connected with said amplifier and said oscillator to produce a beat frequency from the received signal current frequency and the frequency of said oscillator, said oscillator having a variable condenser which is controlled by an electromotor with two equal field coils, said modulator being connected to a high pass filter, a low pass filter and a band pass filter, the output of said high pass filter being connected over a rectifier with a first relay, the output of said low pass filter being connected over another rectifier with a second relay and the output of said band pass filter being connected over a further rectifier with a third relay, the contact of said first relay being connected with one terminal of one of said field coils, the contact of said second relay being connected with one terminal of the other of said field coils, the other terminals of each of said field coils being connected with a differential relay, said field coils producing opposite directions of rotation of said electromotor, the contact of said third relay and said differential relay being inserted in the rotor circuit of said electromotor.

4. A remote control system, comprising a controlling mechanism for producing and transmitting a signal current the frequency of which can be instantly and continuously varied in an even flow, a controlled mechanism responsive to said signal current from said controlling mechanism, a filter group electrically connected with said controlled mechanism to determine from said signal current the direction of movement of said controlled mechanism, a source of signal current associated with said controlled mechanism and influenced by forces tending to deflect devices operated by said controlled mechanism to transmit back to said controlling mechanism another signal current representing said forces, and signal current receiving means including a filter combination, said signal current receiving means being associated with said controlling mechanism to derive from said other signal current received through said filter combination indications representing the magnitude of said deflecting forces.

5. A remote control system comprising a controlling mechanism for producing and transmitting a signal current the frequency of which can be instantly and continuously varied in an even flow, a controlled mechanism responsive to said signal current from said controlling mechanism, a source of signal current coupled to said controlled mechanism to produce another signal current the frequency of which is altered by forces tending to deflect devices operated by said controlled mechanism, and further means coupled to said controlling mechanism for receiving back indications representing the magnitude of said deflecting forces; said further means comprising firstly a high pass filter, a low pass filter and detecting means in combination, the loss characteristics of said filters being such that currents derived from said detecting means vary in accordance with the frequency of said other signal current, and secondly electro-mechanical means responsive to said derived currents.

6. A remote control system comprising: firstly, a controlling mechanism plus a controlled mechanism responsive thereto, secondly, means in said controlled mechanism to derive a signal from forces tending to deflect said controlled mechanism, thirdly, means to translate said signal into the form of frequency deviations in electric currents transmitted from said controlled mechanism back to said controlling mechanism, and fourthly, means mechanically coupled to said controlling mechanism to translate said frequency deviations into mechanical forces: said system operating to convey back to said controlling mechanism a representation of forces tending to deflect said controlled mechanism.

7. A remote control system, comprising a controlled mechanism responsive to a controlling mechanism, an oscillator with a variable condenser associated with said controlled mechanism, one set of plates of said condenser being affixed to one portion of said controlled mechanism, the other set of plates of said condenser being affixed to another portion of said controlled mechanism resiliently connected to said first portion to produce a signal current the frequency of which is varied by forces tending to deflect devices operated by said controlled mechanism, and signal current receiving means coupled to said controlling mechanism and including a filter combination and a detecting device to rectify said signal current, the frequency dependence of attenuation in said filter combination being such that currents derived from said detecting device are uniquely determined by the frequency of said signal current, to impose upon said controlling mechanism forces representing the magnitude of said deflecting forces.

8. A remote control system comprising a controlling mechanism for producing and transmitting a signal current the frequency of which can be instantly and continuously varied in an even flow, a controlled mechanism responsive to said signal current from said controlling mechanism, a source of signal current coupled from said controlled mechanism to produce another signal current the frequency of which is altered by forces tending to deflect devices operated by said controlled mechanism, and further means coupled to said controlling mechanism for receiving back indications representing the magnitude of said deflecting forces and applying corresponding forces to said controlling mechanism; said further means comprising a combination of a high pass filter, a low pass filter and a detecting means, the loss characteristics of said filters being such that currents derived from said detecting means vary in accordance with the frequency of said other signal current, and an electromechanical coupling device responsive to said derived currents and so arranged that said applied forces are independent of the position of said controlling mechanism.

9. A remote control system comprising a controlling mechanism for producing and transmitting a signal current the frequency of which can be instantly and continuously varied in an even flow, a controlled mechanism responsive to said signal current from said controlling mechanism, a source of signal current coupled to said controlled mechanism to produce another signal current the frequency of which is altered by forces tending to deflect devices operated by said controlled mechanism, a combination of high pass filter, a low pass filter and detecting means coupled to said controlling mechanism for receiving back indications representing the magnitude of said deflecting forces, the loss characteristics of said filters being such that currents derived from said detecting means vary in accordance with the frequency of said other signal current; a disc attached to said controlling mechanism; two friction rollers mounted adjacent to said disc; driving means for said rollers to drive said rollers in opposite directions and magnets electrically connected with the output circuits of said detecting means and operated by currents derived therefrom to shift one or the other of said rollers to engage said disc, and to apply to said controlling mechanism a friction force varying according to the magnitude and sense of said deflecting forces.

THOMAS SAMUEL SKILLMAN.

REFERENCES CITED

The following references are of record in the file of this patent:

UNITED STATES PATENTS

| Number | Name | Date |
|---|---|---|
| 1,530,169 | Grimes | Mar. 17, 1925 |
| 2,059,271 | Parker | Nov. 3, 1936 |
| 2,122,622 | Robinson | July 5, 1938 |
| 2,251,064 | Martin et al. | July 29, 1941 |
| 2,280,019 | Alexandersson et al. | Apr. 14, 1942 |
| 2,282,010 | Tolnai | May 5, 1941 |
| 2,408,451 | Sorenson | Oct. 1, 1946 |
| 2,410,599 | Conklin | Nov. 5, 1946 |

FOREIGN PATENTS

| Number | Country | Date |
|---|---|---|
| 638,442 | France | May 24, 1928 |